(12) United States Patent
Trapani et al.

(10) Patent No.: US 7,339,736 B2
(45) Date of Patent: Mar. 4, 2008

(54) LIGHT POLARIZING FILM

(75) Inventors: Giorgio B. Trapani, Cambridge, MA (US); Pradnya V. Nagarkar, Newton, MA (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 11/277,656

(22) Filed: Mar. 28, 2006

(65) Prior Publication Data

US 2006/0158591 A1 Jul. 20, 2006

Related U.S. Application Data

(63) Continuation of application No. 10/365,333, filed on Feb. 12, 2003, now Pat. No. 7,088,511.

(51) Int. Cl.
*G02B 5/30* (2006.01)

(52) U.S. Cl. ............... 359/499; 359/491; 264/1.34; 264/1.35; 264/1.7

(58) Field of Classification Search ............... 359/499, 359/491; 264/1.34, 1.35, 1.7
See application file for complete search history.

(56) References Cited

U.S. PATENT DOCUMENTS

| | | | |
|---|---|---|---|
| 2,454,515 A | 11/1948 | Land | |
| 2,505,148 A | 4/1950 | Ryan | |
| 3,241,662 A | 3/1966 | Robinson et al. | |
| 3,324,218 A | 6/1967 | Gebler et al. | |
| 4,166,871 A | 9/1979 | Schuler | |
| 4,591,512 A | 5/1986 | Racich et al. | |
| 4,895,769 A | 1/1990 | Land et al. | |
| 5,666,223 A | 9/1997 | Bennett et al. | |
| 5,677,024 A | 10/1997 | Abe et al. | |
| 5,738,918 A | 4/1998 | Shen et al. | |
| 5,882,774 A | 3/1999 | Jonza | |
| 6,303,067 B1 | 10/2001 | Wong et al. | |
| 6,358,457 B1 | 3/2002 | Wong et al. | |
| 6,404,469 B1 | 6/2002 | Kitagawa et al. | |
| 6,717,642 B2 | 4/2004 | Sasaki et al. | |
| 2002/0054262 A1 | 5/2002 | Kitagawa | |
| 2002/0140882 A1 | 10/2002 | Kitagawa | |
| 2003/0012936 A1 | 1/2003 | Draheim et al. | |
| 2003/0067572 A1 | 4/2003 | Umeda et al. | |
| 2003/0067574 A1 | 4/2003 | Sasaki et al. | |
| 2003/0098931 A1 | 5/2003 | Saiki et al. | |
| 2003/0103180 A1 | 6/2003 | Masuda et al. | |
| 2003/0124338 A1 | 7/2003 | Inagaki et al. | |
| 2003/0189754 A1 | 10/2003 | Sugino et al. | |
| 2004/0039122 A1 | 2/2004 | Morita et al. | |
| 2004/0052937 A1 | 3/2004 | Ito et al. | |

FOREIGN PATENT DOCUMENTS

| | | |
|---|---|---|
| EP | 0635358 | 1/1995 |
| EP | 0881510 | 12/1998 |
| JP | 2000-235117 | 8/2000 |
| JP | 2002-060707 | 2/2002 |
| WO | WO 02/50209 | 6/2002 |
| WO | WO 03/056368 | 7/2003 |

*Primary Examiner*—Stephone B. Allen
*Assistant Examiner*—Lee Fineman

(57) ABSTRACT

A light polarizing film and method of making same includes a linear polarizer having a first surface and a second surface and having a polarization direction, an optical retarder comprising a simultaneously biaxially oriented polypropylene film disposed adjacent to the first surface of the linear polarizer and having an axis oriented at an angle with respect to the polarization direction, and an adhesive layer disposed between the first surface of the linear polarizer and the optical retarder and having a minimum adhesion strength of about 25 grams per inch.

7 Claims, 2 Drawing Sheets

LIGHT POLARIZING FILM

CROSS REFERENCE TO RELATED APPLICATION INFORMATION

This application is a continuation of U.S. Ser. No. 10/365,333 filed Feb. 12, 2003, now U.S. Pat. No. 7,088,511 the disclosure of which is herein incorporated by reference.

FIELD OF THE INVENTION

This invention relates to a light polarizing film including a linear polarizer and an optical retarder and, in particular, a polarizing film including a synthetic dichroic linear polarizer and an optical retarder in the form of a simultaneously biaxially oriented polymer film.

BACKGROUND OF THE INVENTION

Unpolarized light waves vibrate in a large number of planes about the axis of a light beam. If the light waves vibrate in one plane only, the light is said to be plane polarized. While several materials possess to a degree inherent polarizing properties, synthetic polarizing materials based on thin polymeric films are desirable for their comparative ease of manufacture and handling, their ability to be tailored for particular uses, and the comparative ease with which they may be incorporated into desired end products.

The production of linear light polarizing films has been well described in the art. Linear light polarizing films, in general, owe their properties of selectively passing radiation vibrating along a given electromagnetic radiation vector and absorbing electromagnetic radiation vibrating along a second given electromagnetic radiation vector to the anisotropic character of the transmitting film medium.

Dichroic polarizers are an absorptive variety of linear polarizers that owe their light-polarizing capabilities to the vectorial anisotropy of their absorption of incident light waves. The term "dichroism" is used herein to refer to the property of differential absorption of the components of an incident beam of light, depending upon the vibration directions of the components. Thus, light entering a dichroic film encounters two different absorption coefficients acting on light waves vibrating along different planes, one coefficient being low and one coefficient being relatively high. The emerging light vibrates predominantly in the direction of low absorption. One type of synthetic dichroic sheet polarizer is a polyvinyl alcohol-iodine complex polarizer and variants thereof, such as an "H-Sheet"-type polarizer or stained polarizer, the first such polarizer having been invented by Edwin H. Land of Polaroid Corporation and described in U.S. Pat. No. 2,454,515. In general, a polyvinyl alcohol-iodine complex polarizer comprises a light-absorptive linear polyiodide contained within a polyvinyl alcohol matrix. A polyvinyl alcohol-iodine complex polarizer is generally made, for example, by impregnating a film of polyvinyl alcohol or its derivative with an aqueous solution of a light-absorptive polyiodide or similar dichroic dye, and thermally stretching the film several times its length so that the resultant high molecular weight molecules are unidirectionally oriented. By orienting the polyvinyl alcohol matrix unidirectionally, the transition moments of the light-absorptive polyiodide become correspondingly oriented, and the material thus becomes visibly dichroic.

Another type of synthetic dichroic sheet polarizer is an intrinsic polarizer, such as a K-type polarizer. An intrinsic polarizer derives its dichroism from the light-absorbing properties of its matrix, not from the light-absorbing properties of dye additives, stains, or suspended crystalline material. Typically intrinsic polarizers comprise a sheet of oriented poly(vinyl alcohol) having an oriented suspension of a dehydration product of polyvinyl alcohol (i.e., polyvinylene). Intrinsic polarizers of this kind are formed by heating the polymeric sheet in the presence of a dehydration catalyst, such as vapors of aqueous hydrochloric acid, to produce conjugated polyvinylene blocks and unidirectionally stretching the polymeric sheet prior to, subsequent to, or during the dehydration step to align the poly(vinyl alcohol) matrix. By orienting the poly(vinyl alcohol) matrix unidirectionally, the transition moments of the conjugated polyvinylene blocks or chromophores are also oriented, and the material becomes visibly dichroic. A second orientation step or extension step may be employed after the dehydration step, as described in U.S. Pat. No. 5,666,223 (Bennett et al.).

An optical retarder modifies polarized light by retarding the optical path length for one of the orthogonal components of the light compared to the other orthogonal component. When the light emerges from the optical or phase retarder, there is a phase difference between the two orthogonal components of linearly polarized light. A circular polarizer or elliptical polarizer may be produced when an optical retarder is used in combination with a linear polarizer. Circularly polarized light is created when the two orthogonal components of linearly polarized light are phase shifted with respect to each other by $\lambda/4$, where $\lambda$ represents the wavelength of the light. Elliptically polarized light results from an arbitrary phase shift between the two orthogonal components of incoming light. For example, a ray of unpolarized light passing through a linear polarizer becomes polarized in the polarization direction of the linear polarizer. When the polarization direction of the light is oriented 45 degrees with respect to the optical axis of the retarder, the resulting light is circularly or elliptically polarized, and the vibration direction of the polarized light ray after passing through the retarder appears to move in a helical pattern.

SUMMARY OF THE INVENTION

In general, in one aspect, the invention features a light polarizing film. The light polarizing film includes a linear polarizer having a first surface and a second surface and having a polarization direction, and an optical retarder including a simultaneously biaxially oriented polypropylene film disposed adjacent to the first surface of the linear polarizer and having an axis oriented at an angle to the polarization direction.

In general, in another aspect, the invention features a method for producing a light polarizing film. An oriented sheet of polyvinyl alcohol having a first surface and a second surface and having a polarization direction is provided. An optical retarder including a simultaneously biaxially oriented polypropylene film is disposed adjacent to the first surface of the linear polarizer. An axis of the optical retarder is oriented at an angle to the polarization direction of the linear polarizer. The oriented sheet of polyvinyl alcohol is treated with a light absorbing material.

In general, in another aspect, the invention features an optical system, which includes a polarized light source and a light polarizing film. The light polarizing film includes a linear polarizer with a first surface and a second surface and having a polarization direction, and an optical retarder including a simultaneously biaxially oriented polypropylene film disposed adjacent to the first surface of the linear polarizer and having an axis oriented at an angle to the polarization direction.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
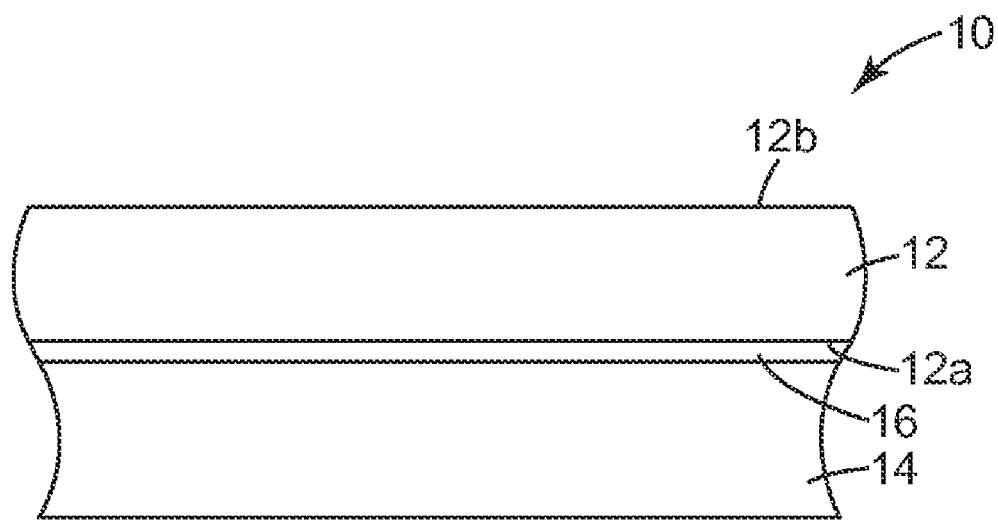
FIG. 1 is a schematic side view of a light polarizing film according to an embodiment of the present invention.

FIG. 1 shows a schematic side view of a light polarizing film 10 according to the present invention. Light polarizing film 10 includes a linear polarizer 12 having a first surface 12a and a second surface 12b, and an optical retarder 14 comprising a simultaneously biaxially oriented polymer film disposed adjacent to the first surface 12a of linear polarizer 12. The combination of linear polarizer 12 and optical retarder 14 is a light polarizing film 10 which functions as an elliptical or circular polarizer. Typically, linear polarizer 12 is in close proximity to optical retarder 14, although this arrangement is not required. Preferably, the two layers 12, 14 are bonded to each other by a layer of adhesive 16.

Figure 2:
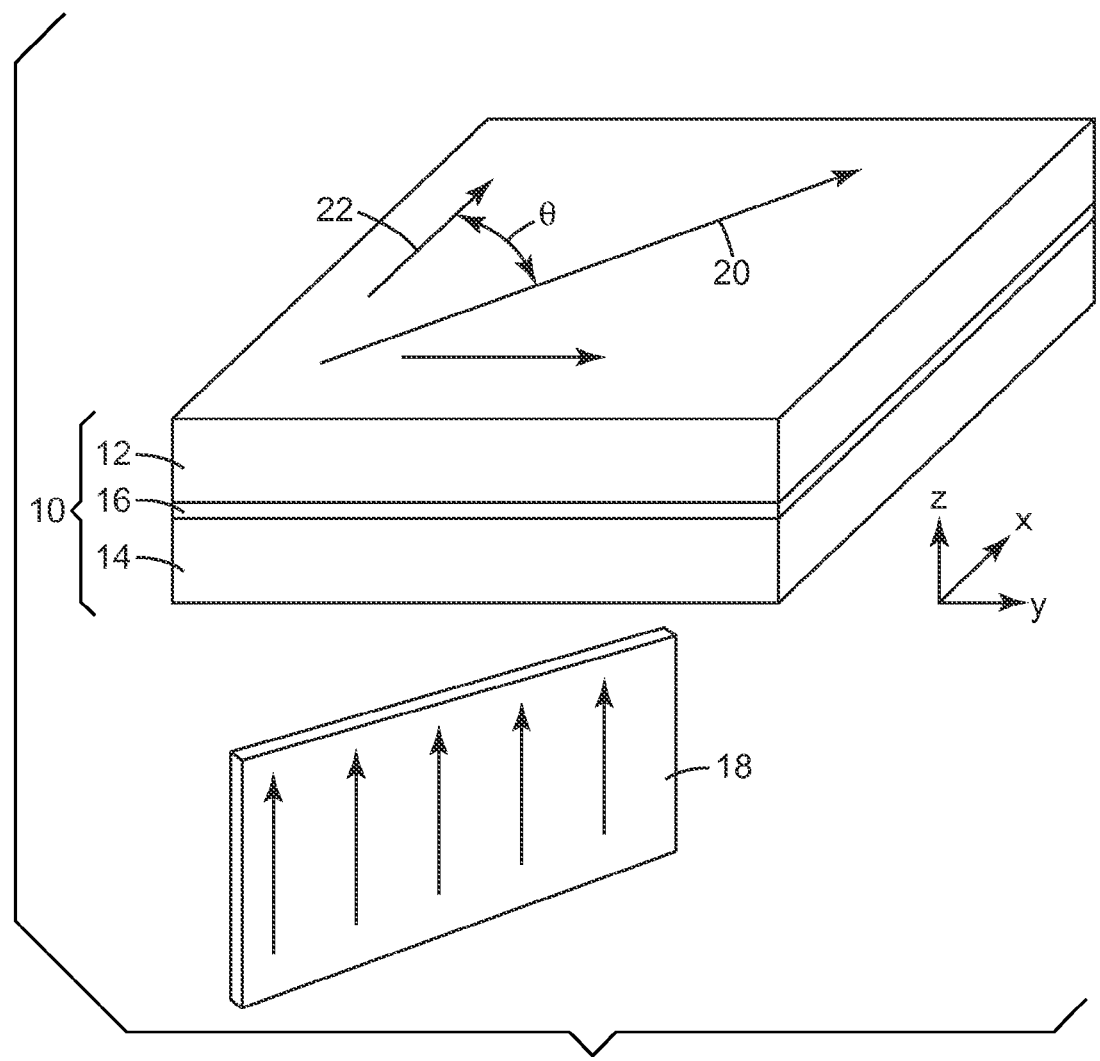
FIG. 2 is a perspective view of a light polarizing film according to an embodiment of the present invention.

As shown in FIG. 2, linear polarizer 12 is configured or oriented within light polarizing film 10 such that a polarization axis or direction 20 of linear polarizer 12 has an absolute angular offset, θ, relative to an optical axis 22 of optical retarder 14, of from about 1 degree to about 90 degrees, preferably about 45 degrees. Polarization direction 20 indicates the plane along which linearly polarized light emerges from linear polarizer 12. Polarization direction 20 will in most cases correspond with the stretch direction of the polarizer, i.e., the direction of polymeric and/or chromophoric orientation.

Light polarizing film 10 may be made with any type of linear polarizer 12, but is preferably made with a synthetic dichroic polarizer, such as an intrinsic polarizer or a polyvinyl alcohol-iodine complex polarizer and variants thereof. Typically, when processing an intrinsic polarizer or a polyvinyl alcohol-iodine complex polarizer, the film may be stretched in a machine direction as with a length orienter, across the width or transverse to the machine direction using a tenter, and/or at a diagonal to the machine direction. When a polymeric sheet is stretched in more than one direction, the polarization direction of the resulting polarizer typically is determined by the direction of the largest degree of stretch.

Optical retarder 14 is typically made from an orientable polymer film, such as a polypropylene or polyester film, which may be made birefringent, for example, by stretching the polymer film in a desired direction or directions. The term "birefringent" means that the indices of refraction in orthogonal x, y, and z directions are not all the same. For films or layers in a film, a convenient choice of x, y, and z axes is shown in FIG. 2 in which the x and y axes correspond to the length and width of the film or layer, respectively, and the z axis corresponds to the thickness of the layer or film. For example as shown in FIG. 2, the machine direction corresponds to the x-axis.

When an orientable polypropylene or polyester film is stretched along the x axis, the typical result is that the indices of refraction, $n_x$ and $n_y$, are not equal for light polarized in a plane parallel to the "x" and "y" axes, respectively. The degree of alteration in the index of refraction along the stretch direction will depend on factors such as the amount of stretching, the stretch rate, the temperature of the film during stretching, the thickness of the film, the variation in film thickness, and the composition of the film.

In making optical retarder 14, a biaxial stretch process is preferably used to orient the birefringent material in the plane of the film, e.g., a flat film tenter stretching process. Biaxially stretched as used herein to describe a film, indicates that the film has been stretched in two different directions. The biaxial stretching of a film in two different directions may result in a net symmetrical or asymmetrical stretch in the two chosen axes. Typically, but not always, the two directions are substantially orthogonal and are in the machine direction of the film and the transverse direction of the film. Preferably, optical retarder 14 has its optical axis in the machine direction. Biaxially stretched films may be drawn in the two directions sequentially, simultaneously, or some combination of sequentially and simultaneously. A simultaneously biaxially oriented film when used herein indicates that significant portions of the stretching in each of the two directions are performed simultaneously. Simultaneously biaxially oriented polypropylene is an especially preferred material for forming optical retarder 14 because it is inexpensive, easy to manufacture, and provides mechanical strength to linear polarizer 12. Examples of simultaneously biaxially oriented films are described in U.S. Pat. Nos. 3,241,662, 3,324,218, 6,303,067 and 6,358,457.

Adhesive layer 16 is typically made from a pressure sensitive adhesive. Pressure sensitive adhesives may be prepared from a composition comprising, for example, a major amount of one or more thermoplastic polymers and may optionally contain such other desired components as UV-absorbers, anti-static compositions, optical brighteners, inert fillers, and plasticizers. Pressure sensitive adhesive should be sufficiently compatible with the light polarizer material and the optical retarder material to substantially prevent degradation of the two films. Pressure sensitive adhesive should also have a degree of optical transparency and clarity sufficient to substantially prevent depolarization, and other like optical distortions. The adhesion or sticking strength of adhesive layer 16 is typically greater than about 25 grams/inch as measured using a peel tester operated at 90 in/min peel rate, 180 degree peel. An example of suitable simultaneously biaxially oriented polypropylene films having an accompanying layer of adhesive such as a pressure sensitive adhesive are commercially available from 3M Company (St. Paul, Minn.), for example the product designations 3701 Tape and 3750 Tape. 3701 Tape has a thickness of about 0.002 inches (0.051 mm), and 3750 Tape has a thickness of about 0.0035 inches (0.089 mm).

To facilitate the mass production of a light polarizing film 10, the present invention also provides a method of manufacture wherein linear polarizer 12 having a polarization direction 20 at a predefined angle, e.g., ±45 degrees relative to the machine direction of linear polarizer 12, is roll-to-roll laminated (or otherwise deposited) onto optical retarder 14 having an optical axis 22 at a predefined angle, e.g., parallel to the machine direction of optical retarder 14. Light polarizing film 10 of the present invention is easier and more inexpensive to manufacture since a subsequent alignment step of linear polarizer 12 with optical retarder 14 is not necessary. Since the relative orientation of polarization direction 20 of linear polarizer 12 to optical axis 22 of optical retarder 14 is preferably at 45 degrees, linear polarizer 12 is preferably stretched or has a largest degree of stretch at a 45 degree angle to the machine direction. One method of stretching a polymeric sheet along a diagonal is described in U.S. Pat. No. 2,505,146, which is hereby incorporated by reference.

One use of light polarizing film 10 involves illuminating optical retarder 14 with polarized light 18 as illustrated in FIG. 2. The incoming polarized light 18 is preferably oriented parallel to or perpendicular to polarization direction 20 of linear polarizer 12. Although the present invention will be discussed with reference to this configuration, other configurations in which linear polarizer 12, optical retarder 14, and incoming polarized light 18 are oriented in different manners with respect to one other are also possible.

After the incoming polarized light 18 passes through optical retarder 14, the light becomes elliptically or circularly polarized. The retardance of optical retarder 14 determines the amount the phase is shifted between the two orthogonal components of the polarized light, and thus determines whether the light becomes elliptically or circularly polarized. If the light is elliptically polarized, the eccentricity of the ellipse varies with the amount the phase is shifted. Preferably, the phase is shifted 200 nm, or a multiple thereof, to produce a variety of elliptically and circularly polarized forms throughout the visible range. Typically, optical retarder 14 has a retardance ranging from about 200 nm to about 3000 nm.

When the elliptically or circularly polarized light passes through linear polarizer 12, polarizer 12 absorbs a portion of the light components that emerged from optical retarder 14. Moreover, since optical retarder 14 will shift the phase of different wavelengths of light to different extents, polarizer 12 will absorb different wavelengths selectively, and thus the emerging light will be substantially colored. For example, if optical retarder 14 has a retardance of about 300 nm, the emerging light may have a blue color or a yellow color, depending on the initial orientation of polarized light 18. The color or wavelength of the emerging light may also vary depending on the direction of the viewing angle.

Figure 3:
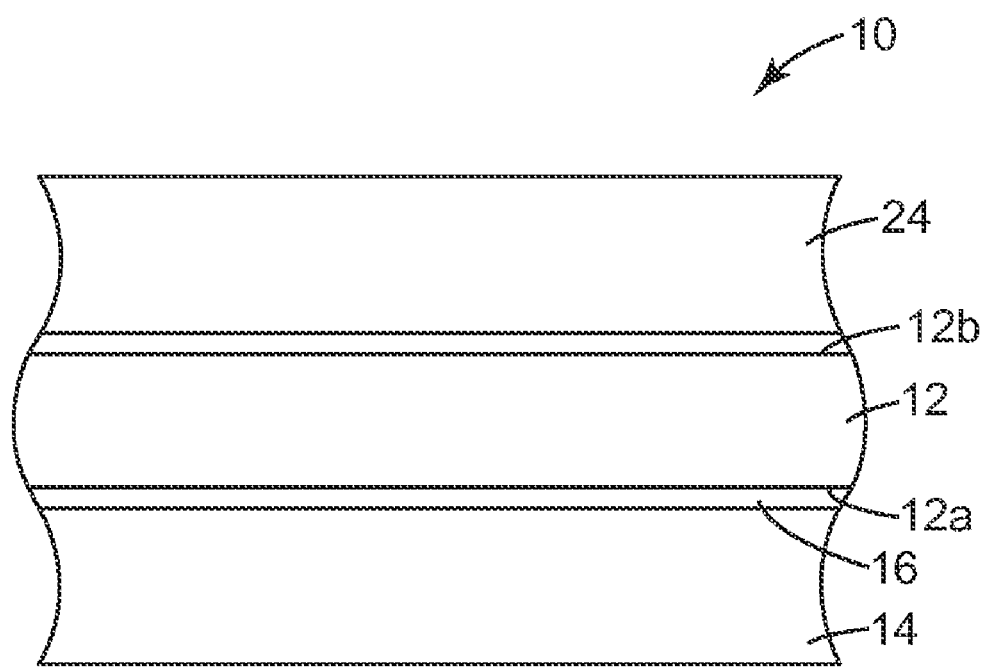
FIG. 3 is a schematic side view of a light polarizing film according to an embodiment of the present invention.

FIG. 3 shows a schematic side view of another embodiment of a light polarizing film 10. Light polarizing film 10 includes a linear polarizer 12 and an optical retarder 14 as shown and previously described in FIG. 1, along with a second optical retarder 24 comprising a simultaneously biaxially oriented polymer film disposed adjacent to the second surface 12b of linear polarizer 12. Typically, linear polarizer 12 is in close proximity to second optical retarder 24, although this arrangement is not required. Preferably, the two layers 12, 24 are bonded to each other by a layer of adhesive 16. Second optical retarder 24 provides further structural support to light polarizing film 10, but does not change the intensity of the emerging light as described previously with respect to the optical system shown in FIG. 2. Additionally, second optical retarder 24 allows polarized light 18 to illuminate either side of light polarizing film 10 and still produce a similar optical effect.

Figure 4:
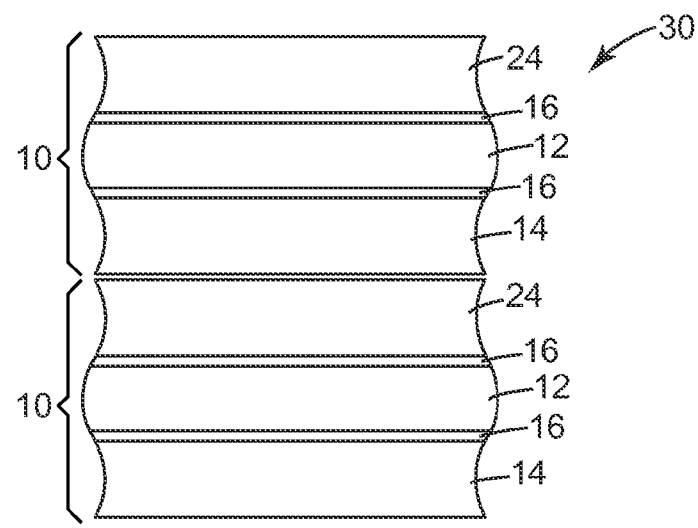
FIG. 4 is a schematic side view of a light polarizing film according to an embodiment of the present invention.

FIG. 4 shows a schematic side view of a light polarizing film 10 with a linear polarizer 12 and an optical retarder 14 as shown and previously described in FIG. 1, along with a second light polarizing film 10 with a linear polarizer 12 and an optical retarder 14. A second optical retarder 24 may be used on either of the light polarizing films 10. Although FIG. 4 shows a stack 30 of two light polarizing films, any number of light polarizing films with various thicknesses and layers may be used. The use of multiple light polarizing films may be used to produce varying optical effects.

The polymeric sheet used to make the linear polarizer generally has a thickness on the order of 0.0005 inches (0.013 mm) to 0.004 inches (0.102 mm). The polymeric sheet is typically stretched from approximately 3.5 times to approximately 6.0 times the original length of the sheet. The stretching step is conducted at a temperature above the glass transition temperature of the polymeric material. Stretching may be effected by the provision of heat generating elements, fast rollers, and slow rollers. For example, the difference in the rotational rate between rollers may be exploited to create corresponding tension in the area of the sheet transported therebetween. When heat generating elements heat the sheet, stretching is facilitated and more desirably effected. Temperature control may be achieved by controlling the temperature of heated rolls or by controlling the addition of radiant energy, e.g., by infrared lamps, as is known in the art. A combination of temperature control methods may be utilized.

Due to the relative weak transverse strength of an oriented vinylalcohol polymer, it may be advantageous to cast, laminate or otherwise affix the vinylalcohol film onto a substrate such as a support film layer, heated roller, or carrier web after orientation. A support layer, when bonded or otherwise affixed to the polymer film provides mechanical strength and support to the article so that it may be more easily handled and further processed.

In the case of a polyvinyl alcohol-iodine complex polarizer, the polymeric sheet either before or after being oriented is treated or submerged in an iodine solution. In the case of an intrinsic polarizer, the oriented polymeric sheet is subjected to a dehydration step whereupon the oriented sheet is treated to "convert" a portion thereof to polarizing molecules consisting of block copolymers of poly(vinylene-co-vinyl alcohol). Methods of producing polyvinyl alcohol-iodine complex polarizers and intrinsic polarizers are described in U.S. Pat. No. 4,166,871 (Schuler); U.S. Pat. No. 4,591,512 (Racich et al.); and U.S. Pat. No. 5,666,223 (Bennett et al.).

In the case of an intrinsic polarizer, the polymeric sheet may be subjected to a second orientation step or extension step in which the oriented polarizer is stretched a second time from about 0% to about 70% beyond that obtained in the first stretch. For any type of polarizer film, the polymeric sheet may also be subjected to a boration step in which the oriented sheet is treated with an aqueous solution of boric acid and borax to effect relaxation and crosslinking. The extension step may be carried out before, during or after the polymeric sheet is in a boration solution. For example, the polymeric sheet can be submerged and allowed to soften and/or swell (i.e., relax) in the boration solution, subsequently removed, and then extended. Alternatively, the polymeric sheet may be extended when still submerged into the boric acid solution.

The boration step may employ two or more baths. For example, in a two-bath boration treatment, the first bath may contain water, and the second, a boric ion contributing species. Alternatively, the order can be reversed or both baths may contain varying concentrations and/or mixtures of boric ion contributing species. Extension may be conducted in any one of these baths.

When the polymeric sheet is borated, the boration solution will generally comprise boric acid and either sodium or potassium hydroxide, or a substance from the class consisting of the sodium and potassium borates, preferably borax. The concentration of boric acid and borax or other borate in the solution or solutions to which the oriented polarizing sheet is subjected are not critical. Preferably, the boric acid is present in a higher concentration than the borax or other borate, and a preferred concentration range comprises 9%-12% by weight of boric acid and 3% by weight of borax. Preferably, the solutions should contain from about 1% to about 7% by weight of borax and from about 5% to about 20% by weight of boric acid.

One or more dichroic dyes may additionally be added to the polymeric sheet in order to neutralize the so-called "blue-leak" and/or "red-leak" of certain dichroic polarizers. Any of a variety of dichroic dyes may be used. Suitable dyes include any of the diazo, triazo or polyazo dyes, or other direct or acid dyes, such as "Intrajet Yellow DG" available from Sensient Technical Colors (Elmwood Park, N.J.) and "Evans Blue" available from Sigma-Aldrich. The dichroic dye may be added to the polymeric sheet at any stage in the process. For example, the dye may be cast into or coated onto the polymeric sheet before the initial stretch, or it may be added during the dehydration, iodine staining, boration, or extension step. A variety of time, temperatures, and concentrations may be used depending on the amount of stain required. Higher temperatures and/or higher concentrations may require less residence time for the polymeric sheet.

Subsequent to the boration step and/or extension step, the oriented polymeric film may be subjected to a baking temperature ranging from about 50° C. to about 90° C. The resulting polarizer can again be bonded or laminated to a support layer, the support layer being the same or different from the layer stripped off, fumed, iodine stained and/or oriented prior to extension thereof.

Any of a variety of materials can be used for the carrier web or support layer. Suitable materials include known polymeric sheet materials such as the cellulose esters (e.g., nitrocellulose, cellulose acetate, cellulose acetate butyrate), polyesters, polycarbonates, vinyl polymers such as the acrylics, and other support materials that can be provided in a sheet-like, light-transmissive form. Polyesters are especially useful, depending on the particular application and the requirements thereof. A preferred polyester is polyethylene terephthalate, available under the Mylar and Estar tradenames, although other polyethylene terephthalate materials can be employed. The thickness of the support material will vary with the particular application. In general, from the standpoint of manufacturing considerations, supports having a thickness of about 0.0005 inches (0.013 mm) to about 0.020 inches (0.508 mm) can be conveniently employed.

During the processing of the polymeric film, optical retarder 14 may be bonded to the oriented polymeric film before or after the iodine staining, in the case of a polyvinyl alcohol-iodine complex polarizer, and before or after the dehydration in the case of an intrinsic polarizer. Optical retarder 14 may then be subjected to a boration, extension, and/or heat treatment step. Alternatively, optical retarder 14 may be bonded or laminated onto the dichroic polarizer after all processing steps are completed for making the polarizer.

It will be apparent to those of ordinary skill in the art that light polarizing films of the present invention may be laminated between or to supporting sheets or films, such as sheets of glass or sheets of other organic plastic materials, and that light polarizing films of the present invention in either laminated or unlaminated form may be employed wherever other forms of light-polarizing plastic materials may be used, for example, in connection with liquid crystal display panels, or other display devices.

Any of a variety of adhesives can be used for laminating the light polarizing films onto other layers or substrates including polyvinyl alcohol adhesives and polyurethane adhesive materials. Since the light polarizing films are normally employed in optical applications, an adhesive material which does not have an unacceptable effect on the light transmission properties of the light polarizing film will generally be employed. The thickness of the adhesive material will vary with the particular application. In general, thicknesses of about 0.0002 inches (0.005 mm) to about 0.002 inches (0.051 mm) are satisfactory.

Various functional layers or coatings may be added to the light polarizing film of the present invention to alter or improve its physical or chemical properties, particularly along the surface of the film. Such layers or coatings may include, for example, slip agents, low adhesion backside materials, conductive layers, antistatic coatings or films, barrier layers, flame retardants, UV stabilizers, abrasion resistant materials, optical coatings, compensation films, diffuse layers, diffuse adhesives, and/or substrates designed to improve the mechanical integrity or strength of the film.

Skin layers or coatings may also be added to impart desired barrier properties to the resulting film or device. Thus, for example, barrier films or coatings may be added as skin layers, or as a component in skin layers, to alter the transmissive properties of the film towards liquids, such as water or organic solvents, or gases, such as oxygen or carbon dioxide.

Skin layers or coatings may also be added to impart or improve abrasion resistance in the resulting article. Thus, for example, a skin layer comprising particles of silica embedded in a polymer matrix may be added to an optical film produced in accordance with the invention to impart abrasion resistance to the film, provided, of course, that such a layer does not unduly compromise the optical properties required for the application to which the film is directed.

Skin layers or coatings may also be added to impart or improve puncture and/or tear resistance in the resulting film. Factors to be considered in selecting a material for a tear resistant layer include percent elongation to break, Young's modulus, tear strength, adhesion to interior layers, percent transmittance and absorbance in an electromagnetic bandwidth of interest, optical clarity or haze, refractive indices as a function of frequency, texture and roughness, melt thermal stability, molecular weight distribution, melt rheology and coextrudability, miscibility and rate of inter-diffusion between materials in the skin layer and polarizing film layers, viscoelastic response, relaxation and crystallization behavior under draw conditions, thermal stability at use temperatures, weatherability, ability to adhere to coatings and permeability to various gases and solvents.

Puncture or tear resistant skin layers may be applied during the manufacturing process or later coated onto or laminated to the polarizing film. Adhering these layers to the film during the manufacturing process, such as by a coextrusion process, provides the advantage that the film is protected during the manufacturing process. In some embodiments, one or more puncture or tear resistant layers may be provided within the film, either alone or in combination with a puncture or tear resistant skin layer.

The light polarizing film of the present invention may be given good slip properties by treating it with low friction coatings or slip agents, such as polymer beads coated onto the surface. Alternately, the morphology of the surfaces of these materials may be modified, as through manipulation of extrusion conditions, to impart a slippery surface to the films.

In some applications, it may be desirable to treat the light polarizing film, optical retarder, or linear polarizer with low adhesion backsize (LAB) coatings or films such as those based on urethane, silicone or fluorocarbon chemistry. Films treated in this manner will exhibit proper release properties towards pressure sensitive adhesives, thereby enabling them to be treated with adhesive and wound into rolls.

The light polarizing film of the present invention may also be provided with one or more conductive layers. Such conductive layers may include metals such as silver, gold, copper, aluminum, chromium, nickel, tin, and titanium, metal alloys such as silver alloys, stainless steel, and inconel, and semiconductor metal oxides such as doped and undoped tin oxides, zinc oxide, and indium tin oxide.

The light polarizing film of the present invention may also be provided with antistatic coatings or films. Such coatings or films include, for example, $V_2O_5$ and salts of sulfonic acid polymers, carbon or other conductive metal layers.

The light polarizing film of the present invention may also be provided with abrasion-resistant or hard coatings, which may be applied as a skin layer. These include acrylic hardcoats such as Acryloid A-11 and Paraloid K-120N, available from Rohm & Haas, Philadelphia, Pa.; urethane acrylates, such as those described in U.S. Pat. No. 4,249,011 and those available from Sartomer Corp., Westchester, Pa.; and urethane hardcoats obtained from the reaction of an aliphatic polyisocyanate (e.g., Desmodur N-3300, available from Miles, Inc., Pittsburgh, Pa.) with a polyester (e.g., Tone Polyol 0305, available from Union Carbide, Houston, Tex.).

One or more of the non-optical layers previously mentioned may be formed as a skin layer over at least one surface of light polarizing film 10 or light polarizing stack 30, for example, to protect linear polarizer 12 from physical damage during processing and/or afterwards. In addition, one or more of non-optical layers may be formed within light polarizing film 10 or light polarizing stack 30, for example, to provide greater mechanical strength or to protect the film or stack during processing.

The non-optical layers, such as adhesive layer 16, ideally do not significantly participate in the determination of optical properties of light polarizing film 10, at least across the wavelength region of interest, the visible spectrum. The non-optical layers are typically not birefringent or orientable, although this is not required. Typically, when the non-optical layers are used as skin layers there may be some surface reflection. When the non-optical layers are found within light polarizing film 10, there will typically be at least some polarization or reflection of light by the non-optical layers in combination with the optical layers 12, 14, and 24 adjacent to the non-optical layers.

The light polarizing film of the present invention may further be laminated to rigid or semi-rigid substrates, such as, for example, glass, metal, acrylic, polyester, and other polymer backings to provide structural rigidity, weatherability, or easier handling. For example, the polarizing film 10 may be laminated to a thin acrylic or metal backing so that it can be stamped or otherwise formed and maintained in a desired shape. For some applications, such as when the film is applied to other breakable backings, an additional layer comprising a simultaneously biaxially oriented polymer film or puncture-tear resistant film may be used.

Various optical layers, materials, and devices may also be applied to, or used in conjunction with, the light polarizing film of the present invention for specific applications. These include, but are not limited to, magnetic or magneto-optic coatings or films; liquid crystal panels, such as those used in display panels and privacy windows; photographic emulsions; fabrics; prismatic films, such as linear Fresnel lenses; brightness enhancement films; holographic films or images; embossable films; anti-tamper films or coatings; IR transparent films for low emissivity applications; release films or release coated paper; compensation films; diffuse adhesives; and polarizers or mirrors.

The light polarizing film made in accordance with the invention may also include one or more anti-reflective layers or coatings, such as, for example, conventional vacuum coated dielectric metal oxide or metal/metal oxide optical films, silica sol gel coatings, and coated or coextruded anti-reflective layers such as those derived from low index fluoropolymers such as THV, an extrudable fluoropolymer available from 3M Company (St. Paul, Minn.). Such layers or coatings, which may or may not be polarization sensitive, serve to increase transmission and to reduce reflective glare, and may be imparted to the films and optical devices of the present invention through appropriate surface treatment, such as coating or sputter etching.

Multiple additional layers on one or both surfaces of light polarizing film 10, linear polarizer 12, and optical retarder 14 are contemplated, and may be in any combination of the aforementioned coatings or films.

The light polarizing film of the present invention may be treated with inks, dyes, or pigments to alter its appearance or to customize it for specific applications. Various types of ink can be used, including one and two component inks, oxidatively drying and UV-drying inks, dissolved inks, dispersed inks, and 100% ink systems. In addition, a dye or pigment may be blended in with a polymer during any portion of the processing.

The appearance of the light polarizing film may also be altered by coloring the film, such as by laminating a dyed film to the polarizing film, applying a pigmented coating to the surface of the film, or including a pigment in one or more of the materials used to make the film.

Both visible and near IR dyes and pigments are contemplated in the present invention, and include, for example, optical brighteners such as dyes that absorb in the UV and fluoresce in the visible region of the color spectrum. Other additional layers that may be added to alter the appearance of the polarizing film include, for example, opacifying (black) layers, diffusing layers, holographic images or holographic diffusers, and metal layers. Each of these may be applied directly to one or both surfaces of film, or may be a component of a second film or foil construction that is laminated to the film. Alternately, some components such as diffusing agents, or colored pigments, may be included in an adhesive layer which is used to laminate the film to another surface.

Various modifications and alterations of this invention will be apparent to those skilled in the art without departing from the scope and spirit of this invention.

What is claimed is:

1. A light polarizing film comprising:
   a linear polarizer having a first surface and a second surface and having a polarization direction wherein the polarization direction is about 45 degrees relative to a machine direction of the linear polarizer;
   a first optical retarder comprising a simultaneously biaxially oriented polypropylene film disposed adjacent to the first surface of the linear polarizer and having an axis oriented at an angle with respect to the polarization direction;

an adhesive layer disposed between the first surface of the linear polarizer and the optical retarder and having a minimum adhesion strength of about 25 grams per inch; and a second optical retarder comprising a biaxially oriented polymer film disposed adjacent to the second surface of the linear polarizer and having an axis oriented at an angle with respect to the polarization direction, wherein the axis is oriented at a 45 degree angle to the polarization angle of the linear polarizer.

2. The polarizing film of claim 1 wherein the retardance of the optical retarder ranges from about 200 nm to about 3000 nm.

3. The polarizing film of claim 1 further comprising an adhesive layer disposed between the second surface of the linear polarizer and the second optical retarder and having a minimum adhesion strength of about 25 grams per inch.

4. The polarizing film of claim 1 wherein the angle of the axis of the first optical retarder is about 45 degrees.

5. The polarizing film of claim 1 wherein the linear polarizer is a synthetic dichroic polarizer.

6. The polarizing film of claim 5 wherein the synthetic dichroic polarizer is a polyvinyl alcohol-iodine complex polarizer or an intrinsic polarizer.

7. The polarizing film of claim 1 wherein the simultaneously biaxially oriented polymer film comprises polyester or polypropylene.

* * * * *